UNITED STATES PATENT OFFICE.

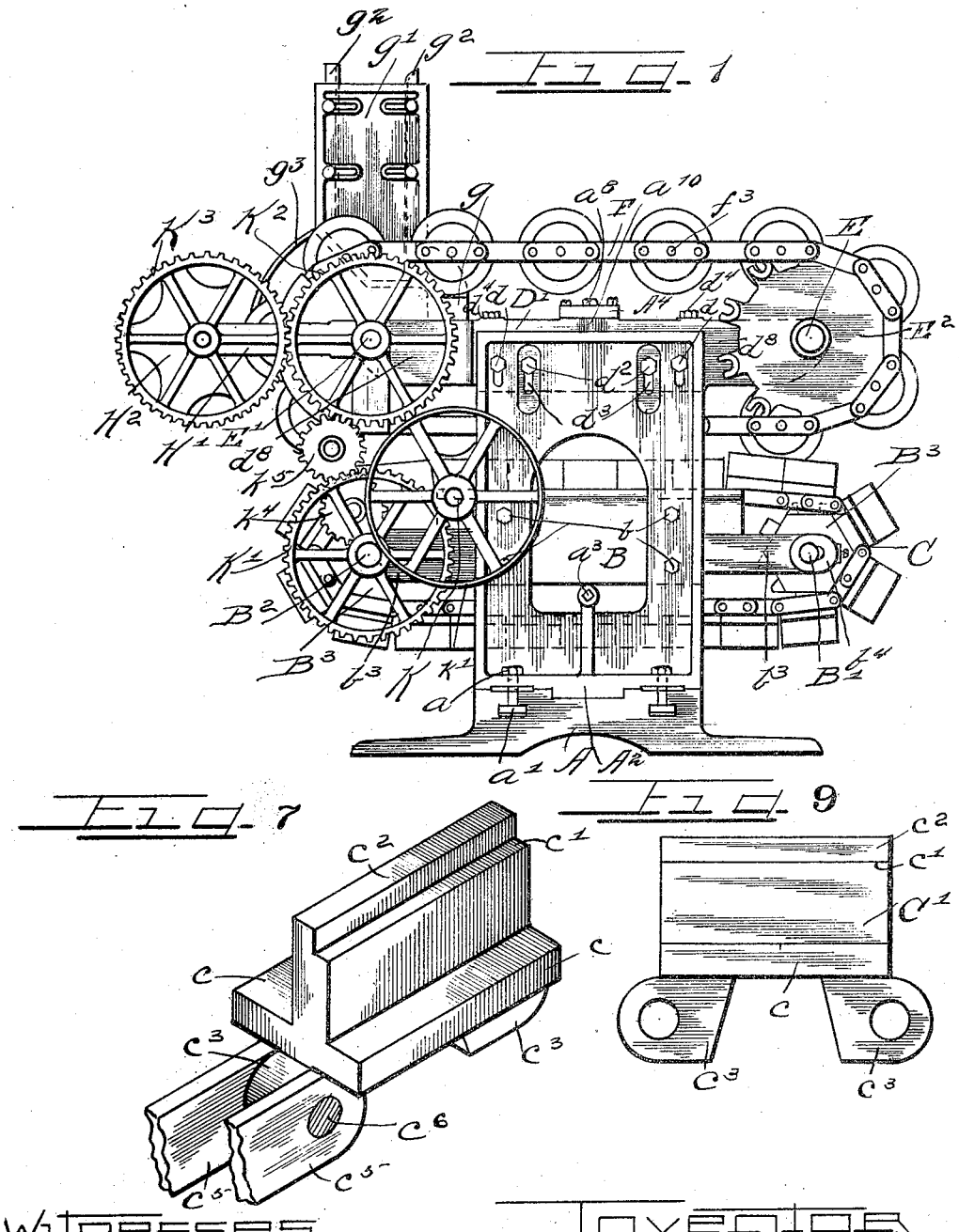

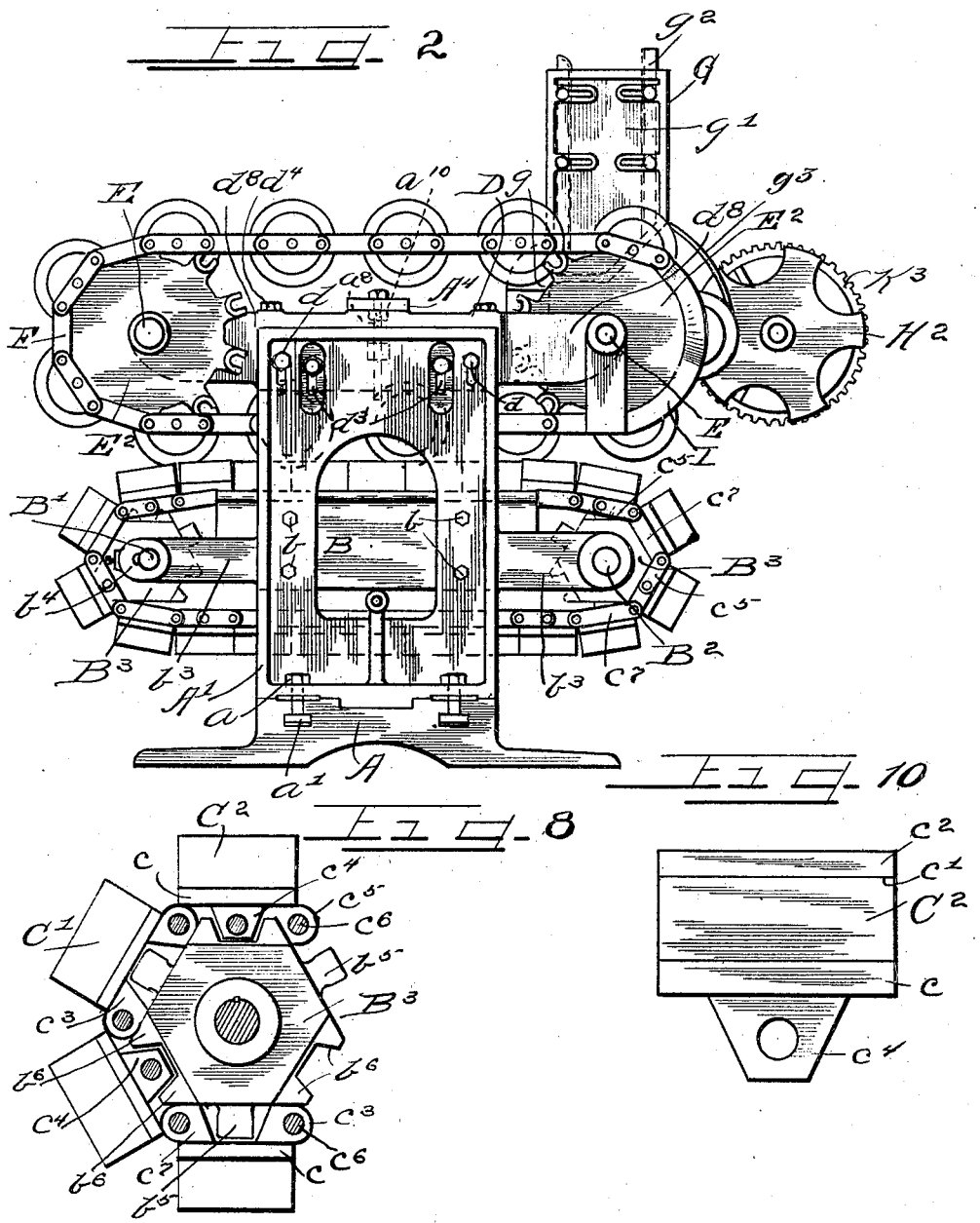

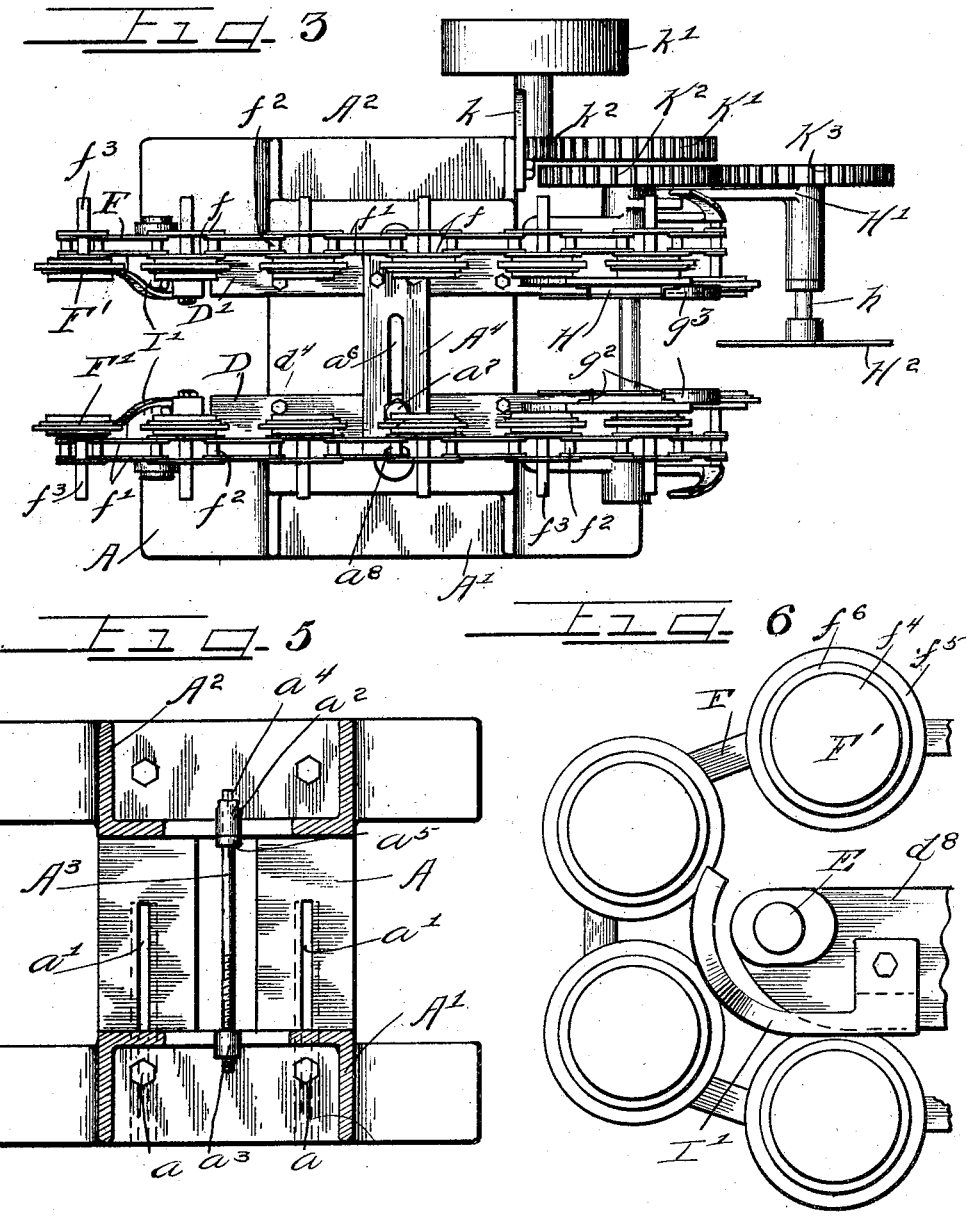

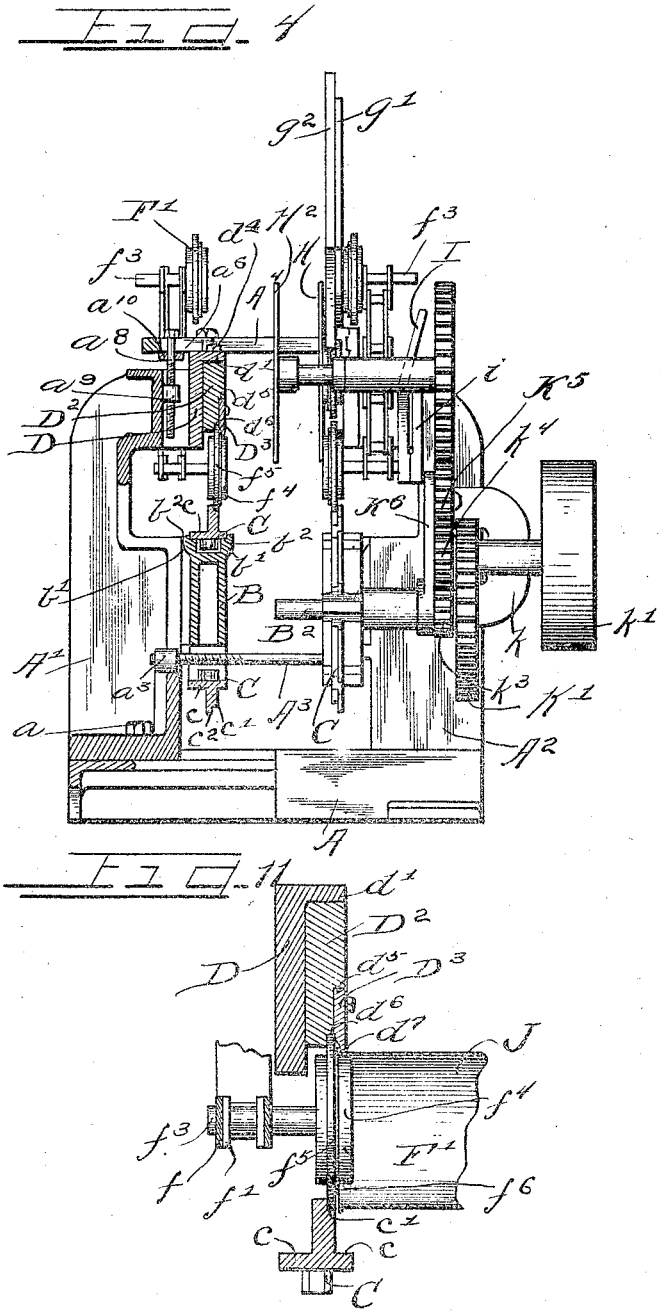

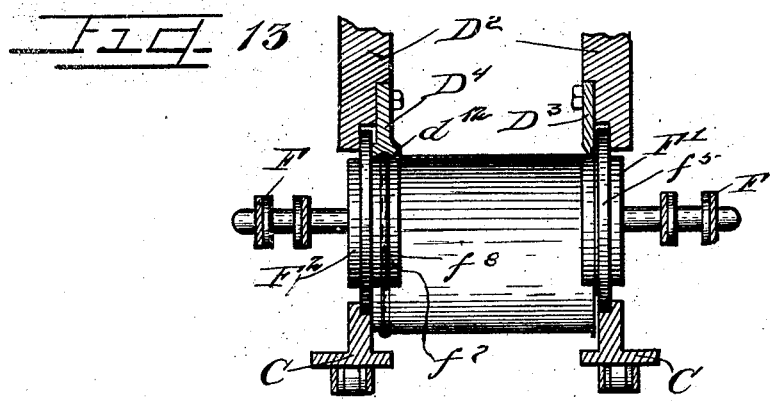
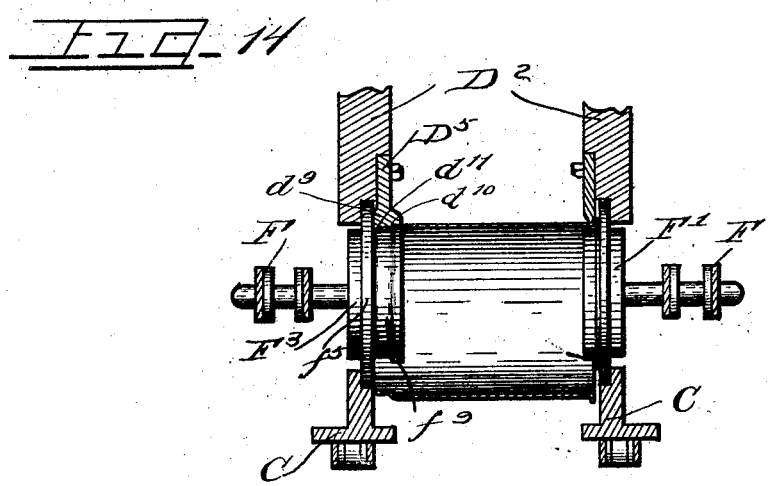
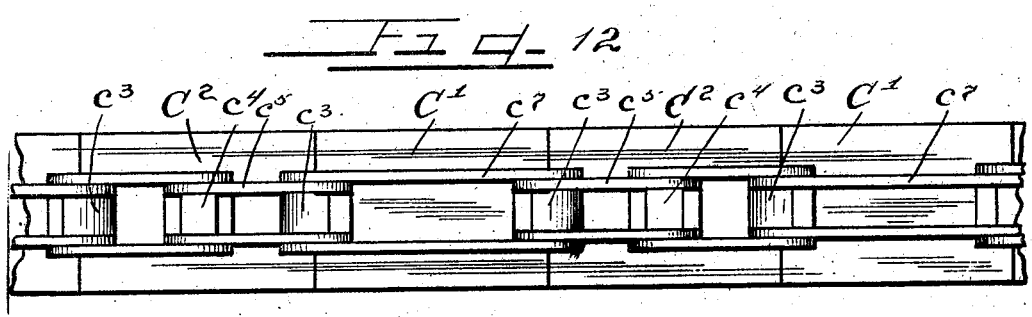

CHARLES STECHER, OF CHICAGO, ILLINOIS.

FLANGING-MACHINE.

No. 877,135.  Specification of Letters Patent.  Patented Jan. 21, 1908.

Application filed July 19, 1906. Serial No. 326,865.

*To all whom it may concern:*

Be it known that I, CHARLES STECHER, a citizen of the United States, and a resident of the city of Chicago, in the county of Cook and State of Illinois, have invented certain new and useful Improvements in Flanging-Machines; and I do hereby declare that the following is a full, clear, and exact description of the same, reference being had to the accompanying drawings, and to the letters of reference marked thereon, which form a part of this specification.

This invention relates to improvements in flanging machines and more particularly to a machine adapted for forming flanges on can bodies preparatory to attaching the heads thereto.

The invention belongs to that class of flanging machines in which a can body is engaged between revolving chucks and caused to rotate against a die thereby forming the flanges on the body.

The object of the invention is to provide a flanging machine capable of operating simultaneously upon a plurality of can bodies and in which a flange may be constructed upon both ends of the body at the same operation.

It is a further object of the invention to provide a machine of simple, yet strong and durable construction which is capable of adjustment to the requirements of can bodies of varying sizes.

It is also an object of the invention to provide a machine capable of forming a bead on the can body to afford an abutment or stop for the can cover.

The invention consists in the matters hereinafter described and more fully pointed out and defined in the appended claims.

In the drawings: Figure 1 is a side elevation of a device embodying my invention. Fig. 2 is a similar view of the opposite side thereof. Fig. 3 is a top plan view. Fig. 4 is a view partly in end elevation and partly in transverse section. Fig. 5 is a horizontal section of the supporting frame. Fig. 6 is an enlarged fragmentary view of the chuck carrying mchanism. Fig. 7 is an enlarged fragmentary perspective view of the pressure chain or belt. Fig. 8 is a fragmentary side elevation of said chain and one of the sprockets therefor with parts removed. Figs. 9 and 10 are side elevations of the links or blocks forming the compression members of said chain. Fig. 11 is an enlarged fragmentary section illustrating the operation of turning the flange. Fig. 12 is an inner plan view of the pressure chain. Fig. 13 is an enlarged fragmentary section illustrating one form of die for forming a bead on the can body. Fig. 14 is a similar view of another form thereof.

As shown in said drawings: the machine is supported upon a frame of any preferred material and construction and comprises a base A and upright side members $A'$ and $A^2$, one of which, $A'$ as shown, is adjustable laterally of the base with respect to the other by means of bolts $a$ which engage through the bottom thereof and through slots $a'$ in said base. Said side frame members $A^1$ and $A^2$ are provided with apertured lugs $a^2$—$a^3$ the latter of which is screw threaded and adapted to receive an adjusting shaft $A^3$ which has threaded engagement at one end therein. The other end of said shaft extends through the lug $a^2$ and is provided with a set nut $a^4$ which engages on the outer side of the lug $a^2$ and with a collar or flange $a^5$ which engages the inner side of said lug and act when said shaft is rotated to move the frame member $A'$ laterally to or from the member $A^2$, dependent upon the direction of rotation.

Rigidly engaged upon the inner faces of the side members $A'$—$A^2$ in any preferred manner but, as shown, by means of bolts $b$—$b$ and above the adjusting shaft $A^3$ are the horizontal bars or ways B which may be of any desired construction and material and are provided with upwardly directed parallel flanges $b'$ having shoulders $b^2$ on the inner faces thereof and forming guide ways for the pressure chains C one of which is carried on each bar. Integral arms $b^3$ extend longitudinally beyond the ends of the ways B and journalled therein at the rear end of the machine are the sprocket shafts $B'$ which as shown are stud shafts extending through said arms and are provided with adjustable bearings $b^4$ for the purpose of adjusting the tension of said chains C. Journaled in the arm $b^3$ at the forward end of the machine is the sprocket shaft $B^2$ and engaged on said sprocket shafts $B'$ and $B^2$ are the sprocket wheels $B^3$ which as shown are hexagonal and provided on alternate faces with one and two cogs respectively, the former $b^5$ of which are situated centrally of the face and the latter $b^6$ at the ends thereo as shown more clearly in Fig. 8. Said pressure chain comprises a plurality of links or blocks C' and C² approximately rectangular in shape and provided with laterally directed flanges $c$ which form relatively broad bases or bearing faces which track upon the shoulders $b^2$ of said ways B as shown more clearly in Fig. 4. The outer faces of said links or blocks C' and C² are rabbeted or grooved on their inner corners to provide a shoulder $c'$ and a ledge $c^2$ and when said chains are passing along the ways B the blocks fit closely together at their ends thereby forming an unbroken track or bearing surface.

The blocks or links C' as shown are provided at each end thereof on their inner faces with an apertured lug $c^3$, the adjacent faces of which diverge from the face of the link and between which the cogs $b^5$ of the sprocket wheels B³ engage.

The links C² are provided centrally with lugs $c^4$ which engage between the cogs $b^6$ of said wheels. The links or blocks C' and C² are articulated together by means of link bars or plates $c^5$ which are pivoted thereto by means of pintles $c^6$, at one end to the lugs $c^4$ of the blocks C² and at the other end to the lugs $c^3$ of the blocks C', and plates $c^7$ are also engaged at the sides of the lugs $c^3$ of the blocks C' by means of said pintles and together with the plates $c^5$ form recesses for the cogs of the sprocket wheels.

Die bar frames D and D' are adjustably engaged at the upper ends of said side frame members A' and A² by means of bolts $d$ which engage in vertical slots in said frame members thereby permitting vertical adjustment of said frames. Extending transversely of the machine is a beam or brace A⁴ which projects beyond the die bar frames and is rigidly bolted at one end to the die bar frame D' and at the other end is provided with a longitudinal slot $a^6$ through which extends a bolt $a^7$ which is engaged in the die bar frame D. At each end of said beam A⁴ is provided a bolt $a^8$ which extends downwardly and has threaded engagement in a lug $a^9$ on the inner face of said die bar frame. The bolts $a^8$ on the die bar frame D—D' are each provided with a collar $a^{10}$ beneath the beam A⁴ by means of which said die bar frames are adjusted vertically when the bolts $d$ are loosened. Said die bar frames are each provided at their top with an inwardly directed flange $d'$ beneath which the die bars D² are engaged, as shown more clearly in Figs. 1 and 2, by means of bolts $d^2$ which extend through vertical slots $d^3$ in said die bar frames into engagement with the die bars D² and adapting said bars to be adjusted vertically. Set screws $d^4$ extend through the flange $d'$ and afford means for keeping the die bars in exact alinement with respect to the pressure chains C. Said die bars D² as shown more clearly in Figs. 4 and 11 are provided on their inner or adjacent faces with downwardly directed shoulders $d^5$—$d^6$, the former of which forms a recess in which is rigidly engaged the die D³, the lower or operating edge $d^7$ of which is reduced in thickness on the side adjacent said die bar and behind which the flange on the can body is formed.

The die bar frames D and D' as shown are provided with longitudinally directed integral arms $d^8$ in the outer ends of which are journalled sprocket shafts E and E' similar to and corresponding with the sprocket shafts B' and B². Sprocket wheels E² are engaged on said shafts and act to drive the chuck carrying chains F by means of which the can bodies are conveyed through the machine. Said chains F as shown comprise bars or links $f$—$f'$ spaced a distance apart laterally by means of the pintles $f^2$ with which they are articulated. Journaled in said links $f$ are the chuck shafts $f^3$ which project outwardly beyond the chains and are provided on their inner or adjacent ends with chuck heads F'—F'. Said chuck heads as shown more clearly in Fig. 11, comprise a hub $f^4$ having a peripheral bearing flange $f^5$ thereon adapted to bear against the shoulders $d^6$ on the die bars and the shoulders $c'$ on the pressure chains C and by means of which said chucks are rotated. On the inner faces of said flanges $f^5$ are provided shoulders $f^6$ of a width approximately equal to the width of the flange it is desired to form on the can body and which acts to turn the end of the can body outwardly behind the edge of the die D³.

Rigidly engaged on the forward ends of the die bar frames D and D' by means of forwardly and upwardly directed brackets $g$ is the feed chute G comprising side members $g'$ which as shown are provided with transverse slots in which are adjustably engaged on the inner faces of said side members, angle iron guides $g^2$ between which the can bodies are fed to the machine. Extending downwardly and forwardly from the lower end of said side members $g'$ are the guides $g^3$ which are curved concentrically with the sprocket wheels E² and act to guide the can bodies between the chucks.

Rigidly engaged on the sprocket shaft E' adjacent the die bar frames are the notched feed wheels H which are in position to receive the can bodies as they leave the feed chute. Journaled in a bracket arm H' extending forwardly from the die bar frame D' is a shaft $h$ on the inner end of which and positioned centrally between the chains F is a notched feed wheel H² which acts in conjunction with the feed wheels H to deliver the can bodies to the chucks.

Outwardly and upwardly directed cam guides I—I are supported on the forward end of the machine by means of brackets $i$ carried on the forward ends of the die bar frames which engage the chuck shafts $f^3$ and force the chucks inwardly engaging the can bodies J on the hubs $f^4$ and bringing the flange $f^5$ into position to be engaged between the shoulders $d^6$ and $c'$.

The arms $d^8$ at the rear end of the die bar frames are provided with upwardly and outwardly curved cam guides I'—I' which engage the inner faces of the flanges $f^5$ and force the chucks outwardly into position to again receive can bodies.

For the purpose of driving the machine a shaft K is journaled in a bearing bracket $k$ on the side frame member $A^2$ and is provided on its outer end with a drive pulley $k'$ and on its inner end with a pinion $k^2$ which meshes with a gear K' carried on the sprocket shaft $B^2$. A pinion $k^3$ is carried on said sprocket shaft $B^2$ and drives intermeshing gears $k^4$—$k^5$ journaled on a bracket $k^6$ on the arm $b^3$. A gear $K^2$ is rigidly engaged on the sprocket shaft E' and is driven by the gear $k^5$ and operates the chuck carrying chains and the feed wheels H. A corresponding gear $K^3$ is carried on the shaft $h$ and intermeshes with the gears $K^2$ and drives the feed wheel $H^2$.

If it is desired to provide a bead or shoulder on the can body to afford a stop or abutment for a can cover one of the dies $D^3$ may be removed and a die $D^4$ or $D^5$ substituted therefor as shown in Figs. 13 and 14. Said die $D^4$ as shown is adapted to form a bead on the can body and is provided with a relatively broad bearing face $d^{12}$ in which is a groove corresponding to the shape of the bead to be formed. Chuck heads $F^2$ are substituted in the chains F for the heads F'—F' and which as shown are each provided with a bearing flange $f^5$ as before described and with a hub $f^7$ having a peripheral rib $f^8$ thereon complemental with and adapted to engage in the groove in the face of the die $D^4$.

The dies $D^5$ are adapted to provide a shoulder in the can body and to turn the end of the body slightly inwardly to permit easy insertion of the cover and for this purpose said dies are provided on their faces $d^9$ with shoulders $d^{10}$ and $d^{11}$ as shown more clearly in Fig. 14 and chuck heads $F^3$ are provided with hubs or bearing faces $f^9$ complemental therewith.

The operation is as follows: The side frame members A' and $A^2$ are adjusted laterally to admit the desired length of can bodies between the chucks and the die bar frames D and D' are adjusted vertically so that chucks of the required size will have their flanges $f^5$ in engagement both with the shoulders $d^6$ on the die bars and with the shoulders $c'$ on the pressure chains. This vertical adjustment of the die bar frames is accomplished by loosening the bolts $d$ and retracting the bolt $a^8$ on the side frame member A' and then rotating the bolt $a^8$ on the frame member $A^2$ thereby raising and lowering the die bar frame D' and by means of the beam $A^4$ raising or lowering therewith the die bar frame D. As the can bodies are fed downwardly through the feed chute G they are engaged between the feed wheels H and $H^2$ which are so timed as to bring a can body into register with oppositely disposed chucks. As said chucks move forwardly their shafts are engaged by the cam guides I—I which force said chucks inwardly into the ends of the can bodies and into position for the flanges $f^5$ to engage on the pressure chains and die bars. Inasmuch as the chuck carrying chains and pressure chains move at the same rate of speed the chucks are rotated against the shoulders $d^6$ and the ends of the can bodies which rest upon the shoulders $f^6$ of the chucks are turned outwardly by the depending edges of the dies $D^3$ as said bodies are rotated with the chucks. As the chucks reach the rear end of the machine the flanges $f^5$ thereof are engaged by the cam guides 1'—1' which force the chucks outwardly releasing the can bodies and spacing the chucks to again receive the bodies at the feed end of the machine. When it is desired to form a bead or shoulder in the can body dies having in their faces the desired configuration are substituted for one or both the dies $D^3$ and the bodies rolled along the same as before described.

Obviously a flanging machine constructed in accordance with my invention is capable of simultaneously operating upon a plurality of can bodies and of forming the flange at each end thereof at the same operation, and obviously the machine may be quickly and accurately adjusted to the requirements of can bodies of various sizes.

I claim as my invention:

1. In a machine of the class described the combination with a base, of adjustable side members engaged thereto a removable die bar engaged to said frame, an adjustable depending die engaged to said die bar, a pressure chain in vertical alinement with said die, and a chuck engaged between the pressure chain and die bar and having a flange thereon engaged between the die bar and said depending die.

2. In a machine of the class described the combination with an adjustable frame, adjustable chuck carrying chains engaged thereto, oppositely disposed chucks movable with said chains adapted to engage a can body therebetween, a peripheral flange on ich chuck, a die bar extending longitudinally of said frame, a pressure chain in vertical alinement therewith adapted together with the die bar to engage the flange on the chuck and rotate the same, a depending die engaged to the die bar and engaging the flange of said chuck between the same and the die bar and means contacting the chucks to force the same oppositely to release the can body.

3. In a device of the class described the combination with a frame of horizontal parallel chuck carrying chains engaged thereto, a horizontal die bar having a shoulder adjustably engaged to said frame, a guideway beneath the same in vertical alinement therewith, a pressure chain having a shoulder supported by and movable along the guideway, oppositely disposed chucks movable between the die bar and pressure chain, a flange thereon engaged by the shoulders of the die bar and pressure chain and rolled along the same, said chucks adapted to engage a can body therebetween and a die removably secured to the die bar extending below the flange on said chucks and adapted to flange the end of the can therebetween.

4. In a machine of the class described the combination with a laterally adjustable frame, a die bar extending longitudinally thereof, a guideway in vertical alinement therewith, a pressure chain supported by said guide way, oppositely disposed chuck carrying chains, chucks engaged thereto, a flange on each chuck engaged between the pressure chain and die bar and rotated thereby, a notched wheel adapted to deliver can bodies to successive pairs of chucks, and a die engaging on the inside of said chuck adapted to flange the end of said can there between.

5. In a device of the class described the combination with a frame of means adjusting one side of the frame with respect to the opposite side, parallel die bars thereon each having a downwardly facing shoulder, means for adjusting said bars both laterally and vertically, a die plate on each bar depending below said shoulders, parallel ways beneath said die bars, pressure chains on said ways having shoulders on their upper faces, chuck carrying chains supported on the frame adjacent each die bar, transversely movable chucks journaled thereon, adapted to engage in the ends of can bodies and rotate them against said dies, a peripheral flange on each chuck adapted to be rotatively engaged between the shoulders on said die bars and pressure chains and guides actuating the chucks to release the can bodies therefrom.

6. In a device of the class described the combination with a frame of parallel die bars adjustably engaged on the top thereof, a die engaged to each die bar and extending below the same, parallel ways carried on the frame in vertical alinement with said die bars, sprocket wheels journaled at the ends of said bars and ways, a pressure chain driven by the wheels on each way, blocks thereon each provided on its inner face with an upwardly directed shoulder forming a continuous shoulder above each way, sprocket chains driven by the wheels on each die bar, oppositely disposed chucks therein each having a flange thereon adapted to be rolled between adjacent faces of said die bars and pressure chains, and positively actuated means for moving said chucks outwardly and inwardly.

7. In a device of the class described the combination with a base, of side frame members thereon, means for adjusting said side members with respect to each other, parallel oppositely disposed die bars adjustably engaged on said side members, downwardly facing dies thereon, a grooved way in vertical alinement with each die bar and parallel therewith, a chain adapted to travel along each way and comprising blocks, each having a shoulder on its inner face, chains carried on the die bars, chucks journaled therein and adapted to be moved laterally, a flange on each chuck adapted to be engaged by said shoulders and rolled against the die bar, and curved cam guides at each end of said die bars adapted to move said chucks inwardly and outwardly.

8. In a device of the class described, the combination with adjustable frame members, of parallel ways thereon, parallel dies above said ways, means for adjusting said dies vertically, a pressure chain adapted to travel along said ways, a sprocket chain adjacent each die, rotative chuck shafts slidably engaged thereon, a chuck on the inner end of each shaft adapted to engage a can body, a peripheral flange on each chuck adapted to be engaged between the die and pressure chain and roll the can body along the dies, a shoulder on said flange adapted to turn the end of the can body up behind said dies, means for driving said pressure chains and chuck carrying chains, means for feeding can bodies to said chucks, and curved guides at each end of the machine adapted to throw the chucks into and out of engagement with said bodies.

9. In a device of the class described, the combination with a frame, of die bars thereon adjustable both laterally and vertically, a die on each bar affording a recess between the die and the bar, a chuck carrying chain adjacent each bar, rotative chuck heads therein, means on said heads adapted to turn the ends of the can bodies upwardly in said recesses, and a continuously driven chain adapted to engage the chuck heads and roll them and the can bodies along the dies.

10. In a flanging machine the combination with a die bar of a die engaged thereto affording a recess therebetween, pressure chains movable longitudinally beneath said die bar, and oppositely disposed chucks movable between said die bar and pressure chain adapted to engage a can body therebetween and together with the die to flange the ends of said can body upwardly in said recess.

11. In a device of the class described the combination with a die bar of a pressure chain positioned below the same, oppositely disposed chucks movable between said die and pressure chain adapted to engage a can body therebetween, a die engaged to and depending from the die bar, a flange on each chuck adapted to flange the ends of said can upwardly between the same and die and means adapted to contact said flanges on the chuck to release the can bodies therefrom.

12. In a device of the class described the combination with a horizontal die of oppositely disposed pairs of horizontal chucks each pair adapted to engage a can body therebetween and to roll the end of the can body upwardly between the chucks and die to flange the same for reception of the head, a notched wheel delivering can bodies to the pairs of chucks and cam guides engaging the pairs of chucks and forcing the same oppositely and outwardly.

13. In a machine of the class described the combination with a horizontal die bar of a die engaged thereto affording longitudinal grooves therebetween, a pressure chain parallel with and movable beneath said die bar, rotating chucks engaged between said die bar and chain and engaging a can body therebetween, said chucks having a flange engaged between the die bar and die adapted to roll the ends of the can body upwardly in said groove against the dies to form a flange at either end of the can body.

14. In a machine of the class described the combination with a pressure chain of a die bar parallel therewith, oppositely disposed chucks adapted to engage a can body therebetween, each having a flange thereon, said flange adapted to be engaged between the die bar and pressure chain, positively timed mechanism adapted to deliver the can bodies between oppositely disposed chucks, a die engaged to each die bar and bearing on the can body inside the chuck and coacting with the chuck to form one end of said can body for reception of the ends and means contacting the flanges of said chucks to release the can bodies therefrom.

15. In a machine of the class described the combination with parallel die bars, a pressure chain movable longitudinally beneath each die bar, a die carried on each die bar providing a recess therebetween, rotating oppositely disposed chucks engaged between said die bars and pressure chain adapted to carry a can body therebetween and together with said dies adapted to flange each end of said can body upward in the recess.

16. In a machine of the class described the combination with an adjustable die bar, a pressure chain carried beneath the same, chucks having a flange thereon, said flange adapted to be engaged between the die bar and pressure chain, a positively operated notched wheel adapted to deliver the can bodies to said chucks, a die engaged to each die bar affording a recess therebetween and coacting with each chuck adapted to flange the ends of said can body upwardly in said recess for the reception of the end pieces and means adapted to engage the chucks and force the same oppositely to release the can body therefrom.

17. In a machine of the class described the combination with horizontal adjustable die bars, dies engaged thereto, a way positioned in vertical alinement beneath each die bar, a pressure chain carried in a groove on each way, oppositely disposed chucks each having a bearing flange thereon rotated between said die bars and pressure chains, a notched wheel adapted to deliver a can body to said chucks in successive order, said chuck and die adapted to flange either end of the can body and means adapted to engage the chuck to release the can body therefrom.

18. In a machine of the class described the combination with an adjustable die bar, an adjustable pressure chain beneath the same, a chuck having a flanged head, said flange engaged between the die bar and pressure chain and adapted to roll the chuck along the die bar, a removable die on said die bar extending below and inside of said flange and adapted to flange the end of the can body therebetween and a cam guide engaging the flange of each chuck at the delivery end of the machine to release the can body therefrom.

19. In a machine of the class described the combination with a die bar of an adjustable die engaged thereto and affording a space therebetween, oppositely disposed rotating chucks, an adjustable chute, a notched wheel adapted to deliver can bodies between oppositely disposed chucks, a guide directing the can bodies to said wheel, means actuating the chuck to engage the can bodies against the dies thereby flanging the ends of said can bodies in said space for the reception of the heads, and means adapted to engage each chuck to release the can bodies therefrom.

20. In a machine of the class described the combination with oppositely disposed rotating chucks, a flange on each, a hub on each chuck, oppositely disposed longitudinal means engaging the flange of said chuck and holding the chucks in unvarying relation, positively operated means adapted to deliver a can body between each pair of chucks, means forcing the chucks inwardly to engage the hubs in the ends of the can body, a die bearing against each can body a distance from its end and against which the ends of said can body are rolled thereby forming the same to receive a can head and positive means releasing each chuck from the can body.

21. In a device of the class described the combination with an adjustable die bar, a removable die carried thereon, a pressure chain movable longitudinally beneath said die bar, an adjustable shaft, a sprocket wheel thereon carrying said chain, oppositely disposed chucks adapted to engage a can body therebetween and having an inwardly directed hub on each and a flange, said flange engaged between said die bar and pressure chain, and said hub together with the die adapted to form a bead adjacent the end of the can body.

In testimony whereof I have hereunto subscribed my name in the presence of two subscribing witnesses.

CHARLES STECHER.

Witnesses:
 C. W. HILLS,
 WM. C. SMITH.